June 3, 1930.　　A. N. GOLDSMITH　　1,761,118
RADIO SIGNALING SYSTEM
Filed Nov. 6, 1924　　6 Sheets-Sheet 1
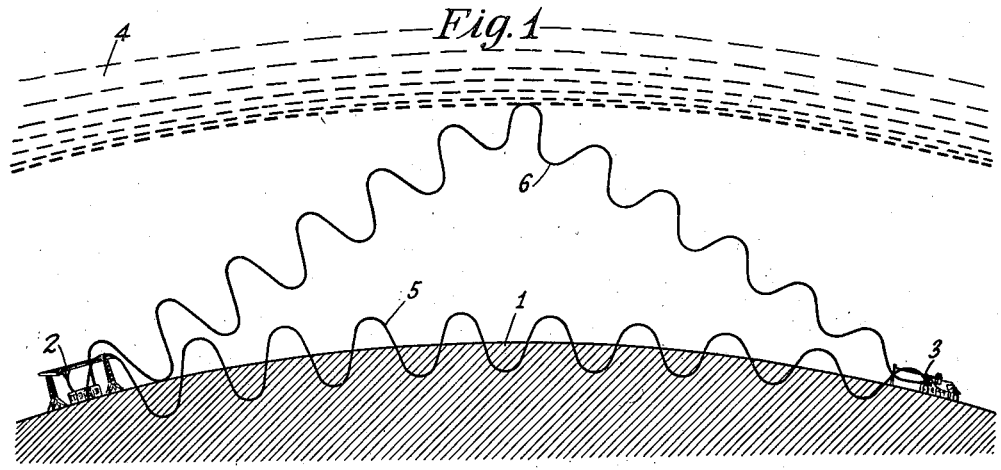
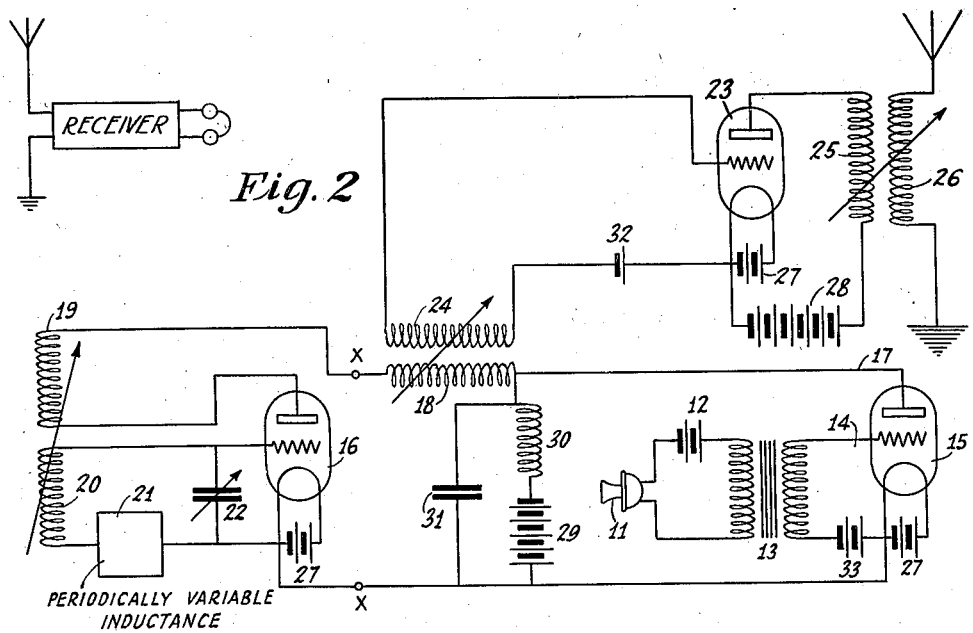
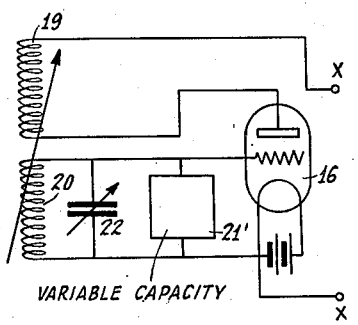
INVENTOR
ALFRED N. GOLDSMITH
ATTORNEY

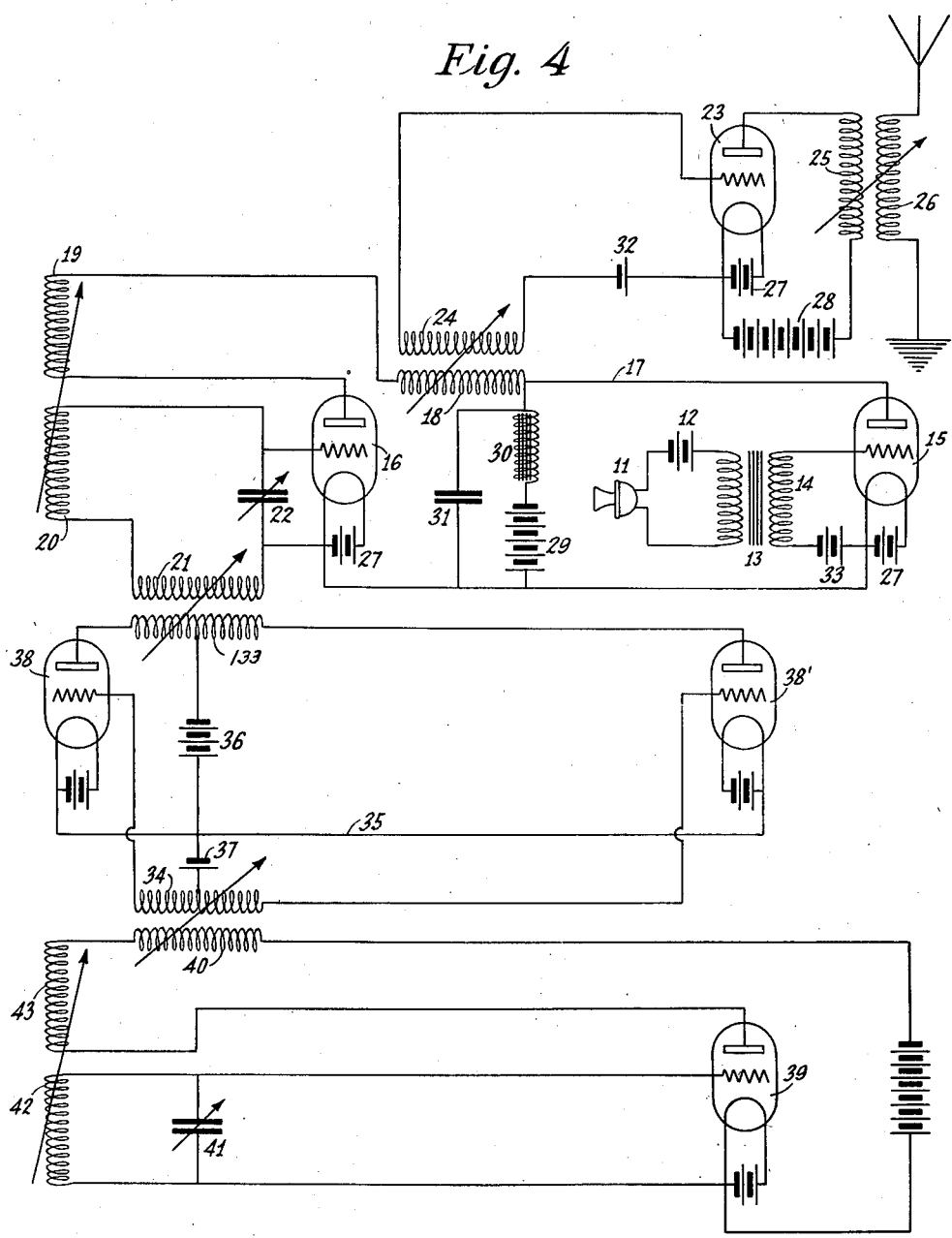

June 3, 1930.  A. N. GOLDSMITH  1,761,118
RADIO SIGNALING SYSTEM
Filed Nov. 6, 1924  6 Sheets-Sheet 3
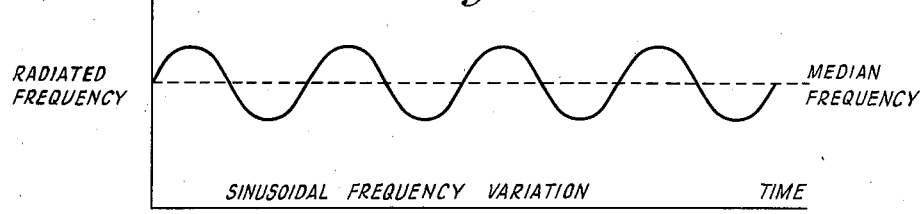
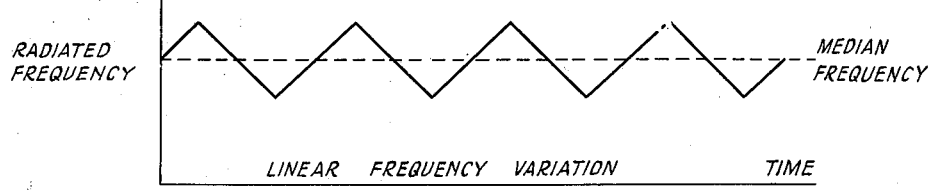
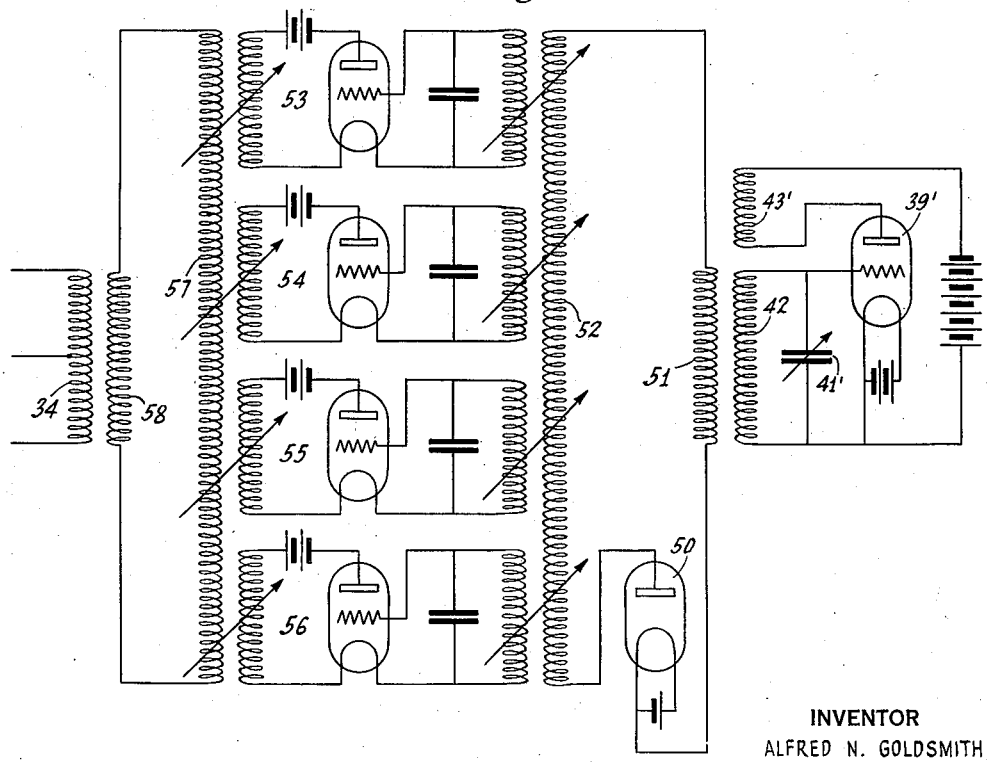
INVENTOR
ALFRED N. GOLDSMITH
BY
ATTORNEY

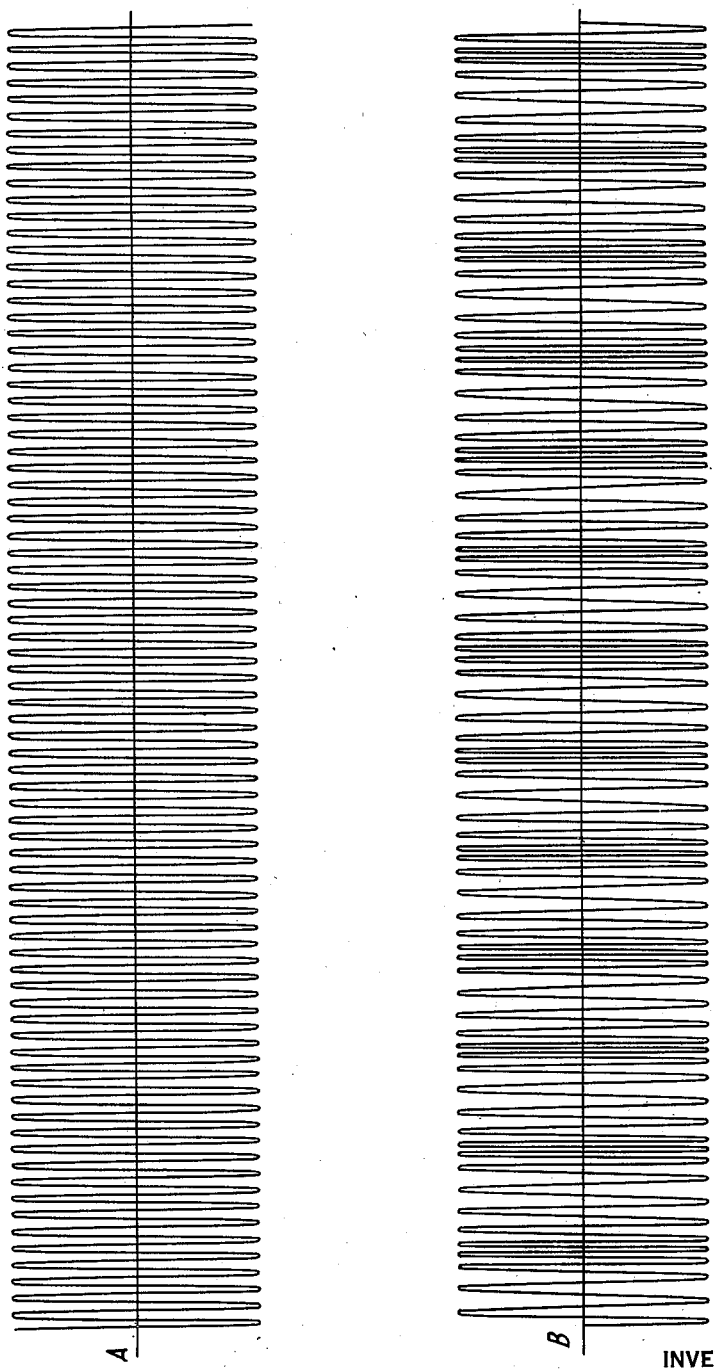

June 3, 1930.  A. N. GOLDSMITH  1,761,118
RADIO SIGNALING SYSTEM
Filed Nov. 6, 1924   6 Sheets-Sheet 5

INVENTOR
ALFRED N. GOLDSMITH
BY
ATTORNEY

June 3, 1930.  A. N. GOLDSMITH  1,761,118
RADIO SIGNALING SYSTEM
Filed Nov. 6, 1924   6 Sheets-Sheet 6
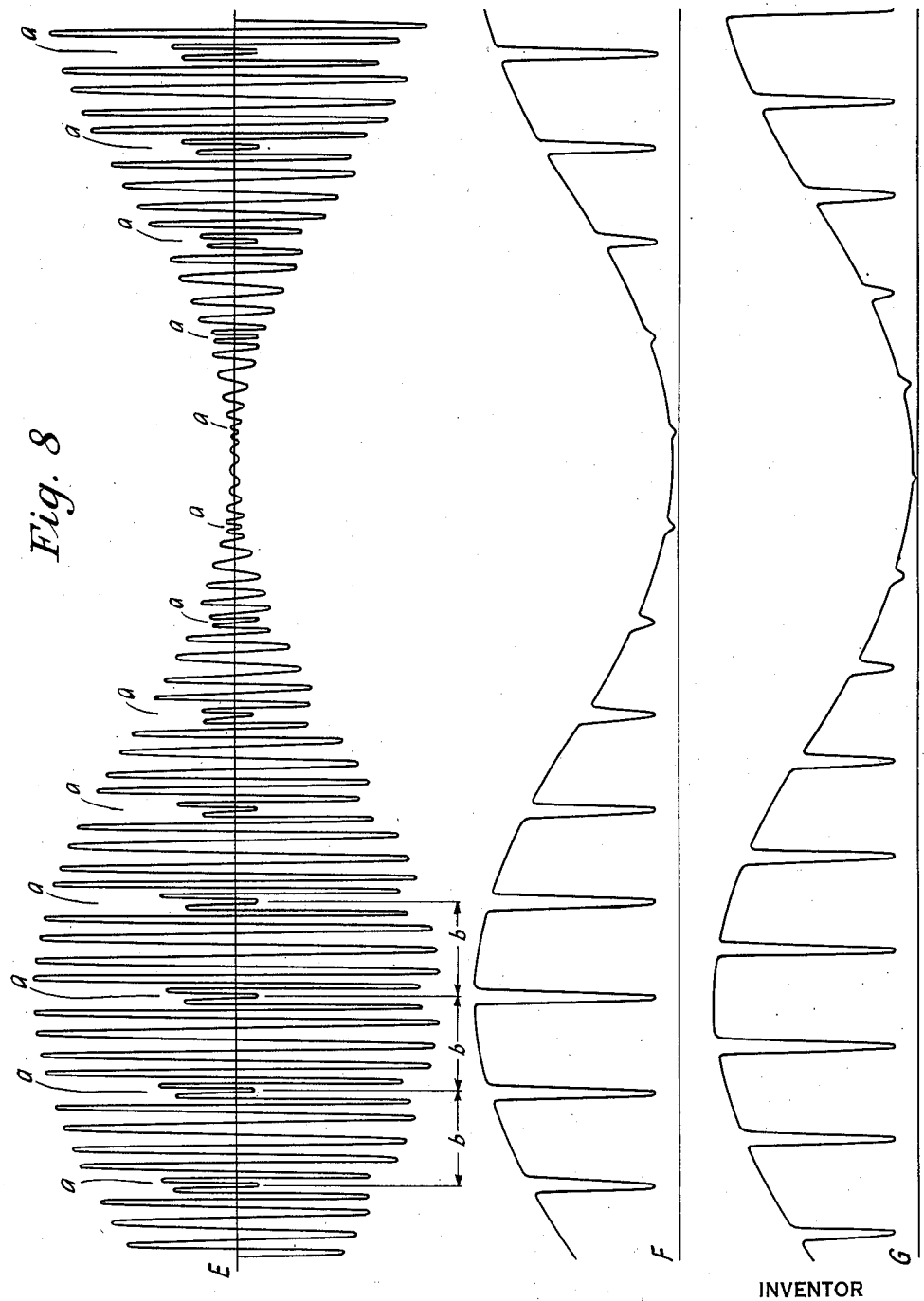
INVENTOR
ALFRED N. GOLDSMITH
BY
ATTORNEY Patented June 3, 1930

1,761,118

UNITED STATES PATENT OFFICE

ALFRED N. GOLDSMITH, OF NEW YORK, N. Y., ASSIGNOR TO RADIO CORPORATION OF AMERICA, A CORPORATION OF DELAWARE

RADIO SIGNALING SYSTEM

Application filed November 6, 1924. Serial No. 748,035.

This invention relates to radio signaling systems and intelligence communicating systems in general and particularly to avoiding the effects of fading.

According to one aspect of the invention, it is particularly adapted to signaling by telephony or telegraphy with rather short waves. With fairly long waves the invention in practice also may be utilized for telegraphy. However, as the greatest difficulty is produced by fading when operating with short waves, a discussion of the characteristics of reception and transmission on such frequencies will be given to particularly emphasize this field of utility.

It is now quite generally conceded that short waves are superior to long waves in several important characteristics. For example, experience has shown that the absorption is considerably decreased and also that proportionately less static and disturbing influences are picked up by the receiving system when tuned to the short waves, particularly at night. It is furthermore readily possible to produce sharper directional transmission effects with short waves.

Despite these numerous important advantages of short waves over long waves, commercial installations still generally utilize long waves for long distance signaling and short waves for short distances because with the utilization of short waves the phenomenon known as "fading" is so pronounced that reliable and undistorted communication is frequently difficult or even impossible. Long waves are therefore used at present for transoceanic and other commercial signaling while relatively short waves are used for broadcasting and amateur signaling. Beyond the range of the frequencies thus used, viz: 15 kilocycles (20,000 meters) to 1,500 kilocycles (200 meters) is a range of high radio frequencies (short waves) containing a vastly greater number of frequencies than those now in use. These high frequencies are at present deprived of much of their usefulness principally on account of the phenomena of fading.

The principal object of my invention as indicated by the preceding discussion is to secure reliable operation of radio-telephonic and telegraphic signaling systems and other intelligence communicating systems employing radio frequency energy especially with waves subject to fading.

Further objects of my invention will appear in the following disclosure of the invention and the description of the method of and an illustrative arrangment of apparatus for carrying out the invention.

In the drawings:

Fig. 1 is a sketch illustrating a plausible explanation which accounts for many of the phenomena of fading.

Fig. 2 is a diagrammatic representation of an illustrative type of apparatus for transmitting and receiving waves which when received produce steady signals despite the periodic effects of fading and Figs. 3 and 4 are similar views of modifications of sending apparatus.

Figs. 5 and 6 are curves illustrating two laws of variations of the transmitted wave length.

Fig. 7 is a diagram of a circuit for controlling the law of variation of wave length.

Figure 8:
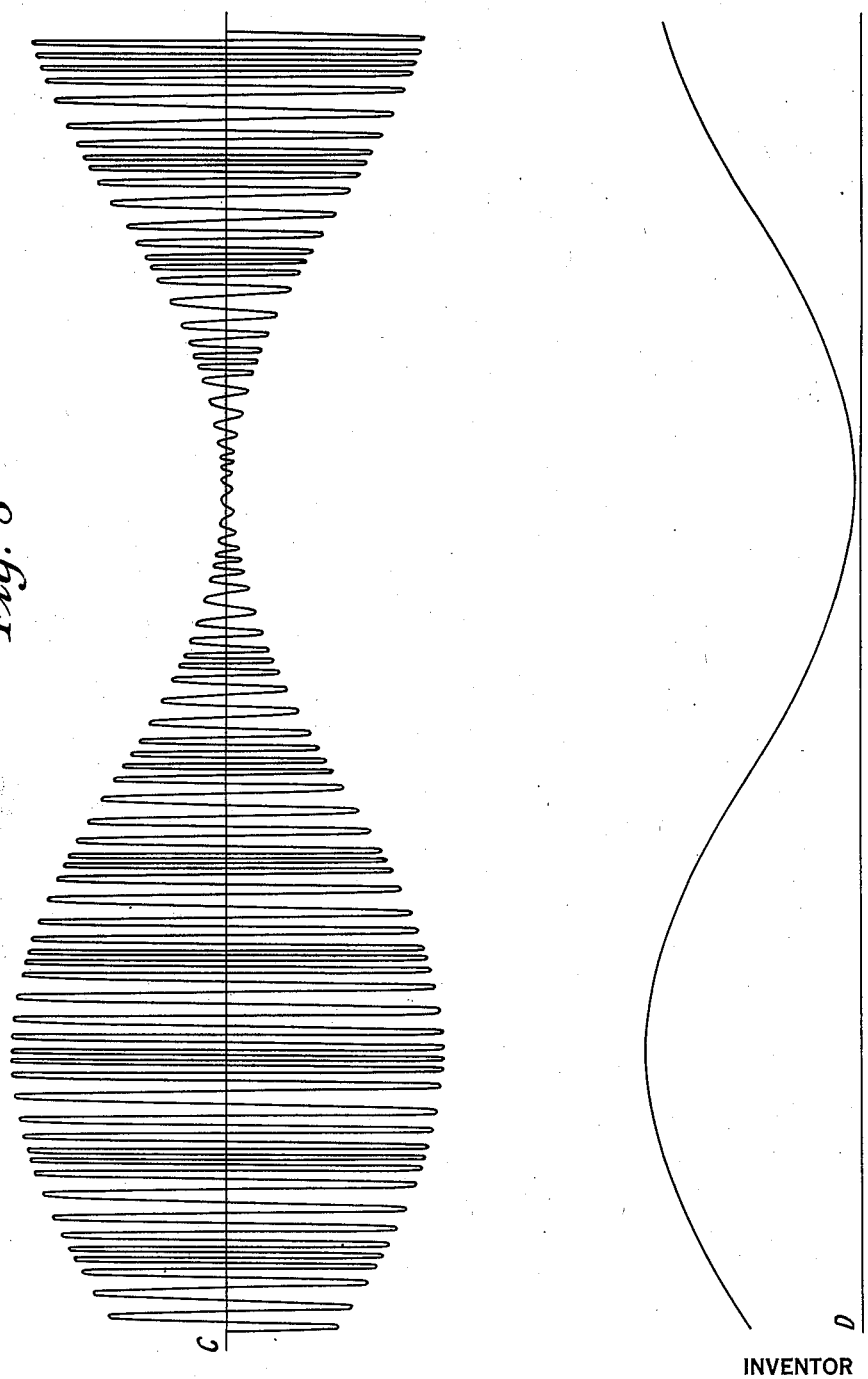
Fig. 8 shows a series of wave forms illustrating a plausible explanation of the operation of systems in accordance with the invention.

To visualize the phenomenon of fading from the viewpoint of the plausible explanation to be advanced, but without limitation to such theory, I have shown in Fig. 1 a lower solid line 1 indicating the contour of the surface of the earth. The transmitting station 2 is indicated at the left and the receiver 3 at the right. Parallel to the earth and above a number of parallel broken lines 4 are shown to indicate the so-called "Heaviside layer." Two sets of curves representing waves are also shown, the lower wave 5 extending along the earth from the transmitter to the receiver and the other wave 6 being reflected from the transmitter to the receiver by the Heaviside layer.

At a height of 25 to 50 miles up, the air enveloping the earth, in accordance with the theory of Sir Oliver Heaviside, is very rare and becomes a fairly good conductor. It is well known that conductors are good reflectors of radio waves and the Heaviside layer therefore acts as a spherical mirror to reflect the waves back to earth. It will be apparent from an inspection that the lengths of the paths of the ground wave 5 and sky wave 6 from the transmitter to the receiver are unequal. If the inequality in the effective lengths of paths is just one half wave length or an odd number of half waves the two waves will oppose and the resulting signal will be equal to the difference in their amplitude. When the difference in the length of the paths is a whole wave length or a multiple thereof the signals will add in phase. At other phase differences the resulting signal will be the geometrical resultant.

In accordance with the explanation of fading advanced, the Heaviside layer is not a fixed spherical reflector of unchanging character. In the day time brilliant sunlight falling upon the surface distorts it and changes its reflecting characteristics so that it is very ineffective and daytime reception is therefore weaker because the ground waves are not greatly reinforced by sky waves, and may be markedly absorbed as well in transit. Fading, however, is less. When sunlight ceases to fall upon the Heaviside layer, it becomes more smooth, thus developing its reflecting powers. At nearby stations the ground signal is sufficiently strong so that in the daytime the reflected wave supplements the ground wave but little. On this theory the improved nighttime reception at distant stations is explained by considering the receiver to be affected by the combination and also by the circumstance that reflected waves are not absorbed so greatly as the ground waves because the latter are largely dissipated by conductors in their path. That is, the effect of sky waves is more pronounced in distance reception.

However, on distant stations, it is found that the signal strength varies so that the message at times gradually dies out and then later gradually increases. This phenomena termed "fading" generally occurs irregularly, but at times it is more or less regular. With long waves it usually occurs at long intervals, that is, in periods of 5 to 10 minutes, at 1,000 meters and at frequencies of this order it is not so pronounced. At 300 meters, when it occurs with regularity, it may have a period in the neighborhood of 15 to 30 seconds. At 100 meters it occurs quite rapidly and makes reception very difficult when it is pronounced.

While the reason for this is not known, it can be explained by considering the reflecting surface as more or less flexible and having an undulating continuously varying surface. When the surface changes, the length of the path of the reflected wave will be altered. If with a perfect reflecting surface the length of the ground and reflected paths are such that the waves add in phase at the receiver, they will no longer be in phase when the surface is distorted. For long waves a relatively small variation in the length of path will cause no appreciable change in phase relation because the change must be a considerable fraction of the length of the wave to appreciably affect the phase relations. Only an undulation of the reflector of large amplitude can thus cause fading. With the shorter waves, however, small undulations will change the length of the reflected path sufficiently to cause the wave to interfere with and oppose the ground wave. This will be evident from a consideration of Fig. 1.

The previous explanation accounts for many of the phenomena of fading but my invention is not restricted thereto, although it also accounts for the operativeness of systems involving my improvements. Other theories, however, may also explain the improvement.

In accordance with the present invention the effects of fading are avoided by radiating a certain range of wave frequencies which are modulated in accordance with the signal and actuating a receiver by means of energy collected on all the frequencies, preferably utilizing a wave which is continuously varied in wave frequency over a certain range in cycles recurring in a certain period.

At any particular instant when fading is a maximum on one wave length it is a minimum on some nearby wave length and at intermediate wave lengths it is more or less pronounced. To avoid the undesired effects the receiver is actuated by integration or accumulation of energy of waves over this band. While the system requires only this band of wave lengths, it is preferable to use a band several times this width to secure a safety factor. However, the band of frequencies to be used in some cases depends upon another factor which will be explained in connection with Fig. 2.

The representative apparatus shown in the drawing for carrying out my invention consists of a radio telephone transmitter which is illustrated in simple diagrammatic form. A microphone 11 in circuit with a battery 12 and the primary of an audio frequency transformer 13 is coupled to the input circuit 14 of a three element vacuum tube amplifier 15. The output of the tube 15 is utilized to modulate the output of a master oscillator 16 in a well known manner, the circuits for this purpose consisting of a connection 17 from the plate of the modulator through coils 18 and 19 to the plate of the oscillator. The frequency of the master oscillator 16 is controlled by the tuning of the grid-filament circuit consisting of coil 20, inductance 21 and condenser 22. Feedback from the plate to the grid circuit to cause the generation of sustained oscillations is secured by coupling the grid coil 20 to the plate coil 19. Coil 18 is utilized for coupling to power amplifiers which increase the high frequency energy to the necessary extent before it is radiated. By way of illustration there is shown a single vacuum tube 23 having a coil 24 in its grid circuit coupled to the output coil 18 of the master oscillator and a coil 25 in the output circuit coupled to the antenna coil 26. Filament batteries are indicated at 27 and anode batteries at 28, 29. 30 is a direct current choke for excluding the radio frequency from the battery 29 and 31 is a radio frequency bypass condenser. 32, 33 are grid batteries for adjusting the potential of the grids of the amplifiers. It will be understood that other usual and necessary accessories of amplifying and oscillating circuits may be used, the illustrations being in simple form because the particular type of amplifier and oscillator forms no part of my invention.

In accordance with the invention as heretofore mentioned the frequency is continuously or successively changed over a certain range. It will be understood that this may be accomplished in many ways.

In the arrangement shown in Fig. 2, the change in wave length is accomplished by periodically and continuously changing the value of inductance 21.

The modification shown in Fig. 3 utilizes a periodically variable condenser 21' for example in parallel to the tuning condenser 22 for varying the wave length of the master oscillator. Any suitable form of condenser may be used, for example, a rotating plate condenser such as shown in Fig. 4 of Patent No. 1,233,841 to Elmer E. Butcher.

By way of example another desirable arrangement for varying the wave length is shown in Fig. 4 consisting of a pair of vacuum tubes which have their plate circuits coupled to the coil 21 in a manner such that the tube circuits serve to periodically change the effective inductance of coil 21. This, of course, changes the frequency of the master oscillator by changing the tuning of the master tuning circuit, 20, 21, 22. In the arrangement illustrated for this purpose the plates of the two tubes 38, 38' are connected to opposite ends of a coil 133 and the filaments are cross connected at 35. The grids of tubes 38, 38' are connected together thru coil 34. From the midpoint of coil 33 a connection is made preferably through a battery 36 to the connection 35 and a grid battery 37 is connected from 35 to the midpoint of coil 34. This circuit arrangement it will be noted is similar to a normal balanced amplifier system. The arrangement is actually however a controlled balanced rectifier in that the resistance of the rectifier is periodically varied at will.

A periodic variation of the wave length is produced by means of a vacuum tube oscillator 39 having a coil 40 coupled to the grid coil 34 of the variable resistance system. A standard type of oscillator circuit is shown consisting of a tuned grid circuit 41 having its plate circuit coupled to the grid coil 42 by the plate coil 43.

An explanation of the action of the apparatus described in producing high frequency oscillations will now be given. The oscillator 39 is adjusted to produce a certain desired frequency which is impressed upon coil 34. As the grids are connected to opposite ends of the coil the potential of one of the grids is raised and the other lowered. The normal potential of the grids is adjusted by means of the bias battery 37 so that the change in potential results in a decreased resistance of the plate circuit of either tube 38 or 38'. An increased current is thus caused to flow in the anode circuit of one of the tubes, that is, the tube at the end of coil 34 which is positive at the particular instant. The additional negative charge on the grid of the other tube has but little effect upon its plate impedance and plate current. The net result in one half of a cycle will be a change in the current from the plate battery from normal to maximum and back to normal. Similarly when the potential of the grids reverses on the other half of the wave of the oscillator 39 the same cycle of plate current changes is reproduced so that the net result is a change in plate current of the variable resistance system at twice the oscillator frequency. It will be noted that the changes in current in the coil 133 are equivalent to partially short-circuiting the coil at double the oscillator frequency. As the coil 133 is a secondary with respect to coil 21 the latter may be considered as a primary of a transformer. By analogy to transformer action it will be evident that the reaction upon coil 21 by the partial short-circuiting and resulting current change of coil 133 decreases the effective inductance and increases the effective resistance of coil 21 at the same frequency. The resistance change of coil 21 should be kept small so as not to change the oscillator current of tube 16 in amplitude to any extent, but only to alter it in frequency. As this coil is in the tuned grid circuit of master oscillator 16 the frequency generated thereby is changed continuously, the cycle of changes occurring at a frequency double the frequency of the oscillator 39. The same frequency changes are of course, reproduced in the power amplifier 23 and in the antenna radiation. The system may also be operated so that the frequency of variation corresponds with the frequency of oscillator 39.

By suitable selection of the constants of the circuits of the master oscillator and the variable resistance system the desired range of radiation frequency and rate of change of radiation frequency is secured.

It will be obvious that various other means may be used for periodically varying the tuning of the master oscillator the arrangements shown being merely illustrative methods of doing so.

In the preceding discussion the change in frequency of the oscillator 16 produced by means of the coil 21 may be secured in accordance with any desired law of variation. By appropriate shaping of the rotating element of the variable inductance 21 or condenser 21′ of Figs. 2 and 3, the variation may be made to correspond with a sine law of variation as shown in Fig. 5. Approximately this type of variation will normally be secured by the arrangement of Fig. 4, although some distortion will usually be produced by the vacuum tube arrangement utilized for producing the varying radiation frequency.

From a consideration of Fig. 5, it will be evident that the rate of change of frequency over the range utilized is not uniform when the sinusoidal frequency variation is utilized. At the median frequency the rate of change of frequency is greatest, while at the instants when the highest and lowest frequencies occur, the rate of change is zero. At intermediate points the rate of change varies between these limits. While this law of variation will produce satisfactory results, it is nevertheless preferable to utilize a law of variation more nearly linear, as shown in Fig. 6.

When this law of variation is utilized, each frequency within the range is equally emphasized while the sinusoidal variation emphasizes the upper and lower limits by causing the neighboring frequencies to occur for longer periods than the median frequency.

In the modifications of Figs. 2, and 3, the linear law of variation may be approximated by appropriate shaping of the elements for cyclically varying the inductance or capacity.

By suitable changes in the wave form of current supplied across coil 34 by oscillator 39 of Fig. 4, changes in the law of variation may be secured. In practice, suitable changes in the wave form may be secured by trial to a certain extent by adjustment of the normal oscillator circuits and by inclusion of trap circuits consisting of inductance and capacity in parallel to remove any undesired components in the oscillator current.

An arrangement admitting of more ready control of the law of variation of frequency is shown in Fig. 7. This consists of a special oscillator from which the fundamental frequency and harmonics thereof of a desired amplitude may be derived. By suitable combination of the fundamental and harmonics as to amplitude and phase any desired wave form may be secured in accordance with the well-known principle of Fourier's theorem. In the drawing, 39′ is the oscillator tube for effecting the change of radiation frequency and 41′, 42 and 43′ are respectively the tuning condenser, grid coil and plate feed-back coil.

The oscillator feeds a rectifier tube 50 through coil 51 which is coupled to coil 42. A second coil 52 is provided in the rectifier circuit for drawing from it a distorted current consisting of alternate halves of the wave from the oscillator 39′. This wave form is rich in harmonics and by coupling thereto a number of vacuum tube amplifier circuits, tuned to desired harmonic frequencies, a desired wave form may be obtained.

In the drawing, four vacuum tube relay circuits 53, 54, 55 and 56 are shown having their input circuits coupled to the coil 52 and their output circuits coupled to a link circuit 57, 58. The input circuits are tuned, for example, to frequencies $f$, $2f$, $3f$, $4f$, etc., and draw these frequencies from the rectifier circuit.

It will be evident that the amplitude of each harmonic can be controlled in various ways, such as by controlling the lighting of the filaments of the relays, or by controlling the couplings between the various circuits and by suitable selection of the harmonics and amplitudes and phases thereof, any desired wave form may be built up, such as that of Fig. 6, for example. In the illustration the coil 58 is shown coupled to coil 34 and the remainder of the system is omitted, as the circuit shown in Fig. 4 may be used for example by substituting the control shown in Fig. 7 for that of Fig. 4.

The relationship of the various frequencies heretofore mentioned are chosen to be interdependent and related in a manner and for reasons which will now be set forth.

In Fig. 8 curve A shows the fundamental radio frequency which would be generated if the inductance of coil 21 was not varied. Let us suppose this to be a frequency of 10,100,000 cycles corresponding to a wave length of 29.7 meters. Let us further suppose that at this frequency fading is very pronounced and occurs at a rather rapid rate. At a particular instant when this frequency of 10,100,000 fades to a maximum extent some other nearby frequency fades to a minimum extent. While the exact difference between these frequencies at which fading is maximum and minimum is not necessarily constant and fixed, it is generally within a few per cent at frequencies of the order of magnitude chosen for illustration and not over 10% in any case. Suppose that when 10,020,000 is absorbed 10,000,000 gets through. In accordance with my invention the radiation frequency will be changed periodically over a range of frequencies at least as great as this frequency difference between waves fading to a maximum extent and waves fading to a minimum extent. Preferably the limit is several times this range, that is in the example given, a range of 100,000 cycles is used so that at a particular instant for example, 10,100,000, 10,060,000 and 10,020,000 may be absorbed and intermediate or nearby frequencies of 10,080,000 and 10,040,000 and 10,000,000 will get through. By suitable adjustment of the change of inductance of coil 21 or capacity 21' the particular range of radiation frequencies obtainable is fixed to correspond with these limits.

Oscillator 39 controls the rate at which the radiation frequency is changed over the range of operation. For telephony this rate must be above audibility for good quality of reproduction for reasons which will be explained subsequently. For telegraphy it must be greater than the key frequency or equivalent "dot frequency".

Another important requirement of the system is the relation between the radiation frequency range and the frequency at which this range is changed. The radiation frequency range should be greater than the rate at which it is changed. This requirement arises from the fact that it is not possible to periodically change over a certain frequency range at a rate of frequency greater than the frequency range. That is, a frequency of 1,000 per second cannot be changed at a rate of 1100 per second. In the illustration selected the frequency range used is 100,000 cycles while the rate or frequency at which this is changed is for example 15,000 cycles per second.

In Fig. 8 the curve B shows the unmodulated radiation frequency changed continuously in frequency over the frequency range 10,000,000 to 10,100,000 every 1/15,000 of a second. To illustrate the change in wave length the difference is exaggerated so that at the points of the curve where the higher frequency occurs the oscillations are crowded together to a greater extent than at the intermediate points where the lower frequency occurs.

The next curve shows a thousand cycle note or modulation impressed on the continuously variable radiation frequency.

Any ordinary receiver with suitable and sufficiently wide tuning may be used to receive this wave. With the frequencies selected the range of wave length is only 1% which is a sufficiently narrow band of wave lengths so that substantially uniform response can readily be obtained to all the frequencies in this band.

It is important to note in connection with the system described that if the receiver tuning is perfectly flat the 15,000 cycle note corresponding to the rate of change of frequency would not be heard even if it were audible. Likewise if the change of frequency was at a rate corresponding to a high audible note of 3,000 for example the note would not be heard. But it will be shown hereafter that when fading is present this situation does not hold as with my system fading itself will cause a frequency or note to be present in the reception which will correspond to the rate of change of radiation frequency. However, perfectly flat tuning is not easily obtainable and this condition in itself will generally give the effect of modulation at the rate at which the radiation frequency is changed. The controlling consideration for using an ultra-audible rate of change of radiation frequency for telephony therefore results from the manner in which fading is manipulated and not from any requirement which would exist if the receiver was tuned, as is usual, with the idea of having it respond differently to nearby radiation frequencies. It will also be noted that I do not signal in the present system by means of the variations in radiation frequency but I utilize the varying radiation frequency to avoid fading.

In the next succeeding curve D the rectified current wave of the receiver is shown which will result when no fading occurs on any of the radiation frequencies within the band used. This wave it will be noted is no different than the received rectified current of an ordinary radio telephone system.

However, suppose that at a particular instant fading is very pronounced on a frequency of 10,000,000. The received wave will have the component due to this radio frequency substantially eliminated as shown in curve E. At each point on the curve where the frequency corresponds to the fading frequency a depression $a$ is shown. These occur at intervals $b$ corresponding to the time required for a complete change of radiation frequency, that is 1/15,000 of a second.

At the receiver the rectified current also will have a greatly reduced amplitude at points on its curve corresponding to the points on the radio frequency curve where fading is pronounced. Curve F shows the effect of the fading of this particular frequency. It will be noted that the breaks in the rectified current occur at a rate of 15,000 per second, that is the rate at which the frequency is changed. Otherwise the curve corresponds with a normal non-fading received effect. Fading effects therefore cause pulses 15,000 cycles per second in the rectified current. However, as this is a frequency above good audibility it produces no interfering effect in the receiver.

If at an another instant a different frequency, say 10,100,000, is strongly subjected to fading the rectified current curve remains of substantially the same shape, the only change being in the location of the depressions as indicated in curve G. The response in the receiver will therefore be identical regardless of what wave length is absorbed or fading.

In the example selected it has been supposed that three frequencies within the range of radiation frequency used are simultaneously fading. The effect in the receiver is nevertheless the same as the number of depressions is merely increased three fold, without changing the characteristics which render the wave audible.

When the method is used for telephony on other wave lengths the same relations between the frequencies will maintain. For example at 500 meters the range of frequency variation might be of the order of 25,000 cycles, that is from 600,000 to 625,000. The rate at which this will be changed may be of the order of, say, 6,000 times per second, this being it will be noted, a frequency above best audibility and the range of frequency variation being several times the rate of frequency change. The range of 600,000 to 625,000 is also sufficiently great to be likely to include a wave subjected to maximum fading and a wave subjected to a minimum fading. Above 500 meters it is doubtful whether under normal conditions obtaining in districts where the ether is crowded the system will be permissible for telephony because the band of wave lengths required is greater than would be normally used. However, at high frequencies such as 100 meters, the range required is easily within allowable limits.

In the application of the invention to radio-telegraphy the coordination of the requirements outlined to the characteristics of radio telegraph signals presents a somewhat different situation which enables the system to be used for considerably longer waves and also permits it to be used with short waves having a lower range of frequency variation.

Modulations in telegraphy due to the rate of key interruption even in high speed signaling are never in present-day practice over 100 "dot-cycles" per second this corresponding to a rate of transmission of 200 words per minute. In the reception of telegraphic signals on continuous waves some means such as a heterodyne or chopper is utilized to render them audible. It is, therefore, apparent that the introduction of an audible component in the transmission is not precluded and in some instances may be desired. For these reasons in the utilization of the invention for telegraphy I may change the radiation frequency at an audible rate. A rate of change of 1,000 cycles may be used for example, this being considerably higher than the modulation frequency. The range of wave length variation should correspond to a frequency several times the rate at which the frequency is changed for the reasons heretofore given. If the rate is five times the range, for example, the band of frequencies utilized would be 5,000 cycles. At some wave lengths this will be sufficient range but at other wave lengths it may be necessary to increase the range sufficiently to include wave lengths subjected at a particular instant to maximum and minimum fading. The exact range which is desirable for any given wave length for telegraphy and telephony cannot be definitely predetermined as this is likely to depend upon many factors such as the locality, season of the year, congestion of the ether, distance of the transmitter, etc. The particular range to be used and whether this range depends on natural conditions or results from the conditions of operation will therefore preferably be determined experimentally in each particular instance.

As an example of the application to telegraphy at 2,000 meters (150,000 cycles) (which is approaching the upper limit of utility for such service) the rate at which the wave length or radiation frequency will be changed may be 500 cycles. A frequency of this order is selected because it must be greater than the modulation or key frequency for the same reason that the range is greater than the rate in the preceding discussion. A range of radiation frequency of 2500 cycles for example may be used. This it will be noted is several times the rate of 500 cycles (selected in the example). Granting that this is a sufficient range to include a wave length of maximum and minimum fading, the necessary frequency range is 150,000 to 152,500 cycles which is changed at a rate of 500 cycles per second. In an ordinary receiver tuned to admit a band of wave lengths the 500 cycle note will scarcely be heard when fading is not pronounced because of the uniform response of the receiver to the entire band. A chopper, heterodyne or other continuous wave detector will then be required. When fading is present the signal will be heard with a 500 cycle note corresponding to the portions of the radiated wave which are absorbed due to fading. In general for telegraphy, a chopper or heterodyne will be used so that the production of the audible note for reception will not be dependent on the existence of fading.

When shorter waves such as 30 meters are utilized for telegraphy, the range may be decreased considerably over that given in the illustration for telephony at this frequency. A 1,000 cycle rate of frequency change between frequencies of 10,000,000 and 10,010,000 for example, would amply suffice to meet the requirements imposed by the relation of frequencies set forth heretofore. However, assuming that at this wave the difference in frequency between a maximum and minimum fading point is 20,000 cycles it will be clear from the foregoing explanation that the latter is the minimum range of frequency change for entirely avoiding the effects of fading. In this illustration the radiation frequency would be changed from 10,000,000 to 10,020,000 at a rate of 1,000 per second.

It will be understood that the frequencies selected for illustration are merely arbitrary. The relation between the frequencies is likewise approximate and assumed for illustrative purposes and may be varied with considerable latitude within the requirements outlined without departing from my invention.

Likewise the particular apparatus utilized is in no sense essential as various equivalents will be obvious to those skilled in the art.

Known types of receivers employed for detecting intelligence communicated by radio frequency energy may also be readily adapted for reception of the waves, a suitable range of admittance frequency being the only requirement for the receiving system for telephony and telegraphy and other intelligence communication systems.

Having described my invention what I claim is:

1. The method of reducing fading in radio signaling which consists in generating a plurality of wave frequencies, the range of said frequencies being less than 10%, signaling by superposing modulations on all of said frequencies and actuating a receiver adapted to be actuated by all of said frequencies simultaneously by means of energy collected on all of said frequencies.

2. The method of reducing fading in radio signaling which consists in generating a plurality of wave frequencies, the range of said frequencies being less than 10%, signaling by superposing modulations on said frequencies and causing the wave frequencies to recur at a rate greater than the modulation frequency and actuating a receiver adapted to be actuated by all of said frequencies simultaneously.

3. The method of transmitting radio signals which consists in generating progressively different wave frequencies, the range of wave frequencies including nearby differently fading frequencies, signaling by superposing speech modulations on all of said frequencies, and causing the wave frequencies to recur at a rate greater than the modulation frequency.

4. The method of reducing fading in radio signaling which consists in generating a wave having a varying wave frequency, the range of frequency of said wave being less than 10%, signaling by superposing modulations on said frequencies and causing the different frequencies of said wave to recur at a rate greater than the modulation frequency and actuating a receiver adapted to be actuated by all of said frequencies simultaneously.

5. The method of reducing fading in radio signaling which consists in generating a wave having a continuously varying wave frequency, the range of frequency of said wave being less than 10%, signaling by superposing modulations on said wave and causing the cycle of frequency changes of said wave to recur at a rate greater than the modulation frequency and actuating a receiver adapted to be actuated by all of said frequencies simultaneously.

6. The method of reducing fading in radio signaling which consists in generating a plurality of wave frequencies, the range of wave frequencies including solely nearby differently fading frequencies, signaling by superposing modulations on all of said frequencies and actuating a receiver by means of energy collected from all of said frequencies.

7. The method of reducing fading in radio signaling which consists in generating a plurality of wave frequencies, the range of wave frequencies including nearby differently fading frequencies, signaling by superposing modulations on said frequencies and causing the wave frequencies to recur at a rate greater than the modulation frequency and actuating a receiver adapted to be actuated by all of said frequencies simultaneously.

8. The method of reducing fading in radio signaling which consists in generating a wave having a continuously varying wave frequency, the range of wave frequency including nearby differently fading frequencies, signaling by superposing modulations on said wave and causing the cycle of frequency changes of said wave to recur at a rate greater than the modulation frequency and actuating a receiver adapted to be actuated by all of said frequencies simultaneously.

9. The method of transmitting radio signals which consists in generating a wave having a continuously varying wave frequency, the range of wave frequency including nearby differently fading frequencies, signaling by superposing speech modulations on said wave and causing the wave frequencies to recur at a rate greater than the modulation frequency.

10. The method of reducing fading in radio signaling which consists in generating progressively differing wave frequencies, the range of frequencies including nearby differently fading frequencies, signaling by superposing modulations on said frequencies and causing the wave frequencies to recur at a rate greater than the modulation frequency and actuating a receiver adapted to be actuated by all of said frequencies simultaneously.

11. The method of reducing fading in radio signaling which consists in generating progressively different wave frequencies, the range of frequency including solely nearby differently fading frequencies, signaling by superposing modulations on said wave, causing the wave frequencies to recur at a rate different than the modulation frequency and actuating a receiver by means of energy collected on all of said frequencies and actuating a receiver adapted to be actuated by all of said frequencies simultaneously.

12. The method of transmitting radio signals which consists in generating a radio frequency wave, signaling by superposing speech modulations on said wave, varying the radiation frequency in a cycle having a range including a frequency fading to a maximum extent and a frequency fading to a minimum extent and causing said cycles to recur at a rate which is above the modulation frequency of the signal and which is less than the range of radiation frequency.

13. The method of transmitting radio signals which consists in generating a radio frequency wave, modulating said wave in accordance with speech frequencies, varying the radiation frequencies in a cycle having a range including a frequency fading to a maximum extent and a frequency fading to a minimum extent, said range of radiation frequency being equal to the number of cycles corresponding to radio frequencies and causing said cycles to recur at a radio frequency less than said range of radiation frequency and greater than the modulation frequency.

14. The method of reducing fading in radio signaling which consists in generating a radio frequency wave, signaling by superposing modulations on said wave, varying the radiation frequency of said wave in a cycle having a range including a frequency fading to a maximum extent and a frequency fading to a minimum extent and causing said cycles to recur at a rate which is greater than the modulation frequency of the signal and which is less than the range of radiation frequency and actuating a receiver adapted to be actuated by all of said frequencies simultaneously.

15. The method of transmitting radio signals which consists in generating a radio frequency wave, signaling by superposing speech modulations on said wave, varying the radiation frequency in a cycle having a range equal to a radio frequency and causing said cycles to recur at a frequency greater than the modulation frequency of the signal and less than the range of radiation frequency.

16. The method of transmitting radio signals which consists in generating a radio frequency wave, signaling by superposing speech modulations on said wave, varying the radiation frequency in a cycle having a range including a frequency fading to a maximum extent and a frequency fading to a minimum extent, said range of radiation frquency being equal to the number of cycles corresponding to radio frequencies and causing said cycles to recur at a radio frequency less than the range of radiation frequency and greater than the modulation frequency.

17. The method of transmitting raido signals which consists in generating a radio frequency wave of a frequency greater than 500,000 cycles, modulating said wave at an audible frequency, varying the radiation frequency in a cycle having a range including a frequency fading to a maximum extent and a frequency fading to a minimum extent, said range of radiation frequency corresponding to a radio frequency and causing said cycles to recur at an inaudible frequency less than the range of radiation frequency and greater than the modulation frequency.

18. Radio transmitting apparatus adapted for the substantial elimination of fading effects comprising means for generating high frequency oscillations, means for modulating the output of said means, an inductance coupled to a circuit of the generator, a pair of vacuum tubes having their plate electrodes connected to opposite ends of the inductance and their filaments connected to the midpoint of the inductance, a coil having its ends connected to the grids of the vacuum tubes and a vacuum tube oscillator coupled to said coil for causing variations in the radiation frequency to be produced.

19. Radio transmitting apparatus for the substantial elimination of fading effects comprising means for generating high frequency oscillations, means for modulating the output of said generating means, an inductance coupled to a circuit controlling the frequency of said generator, a pair of vacuum tubes having their plate electrodes connected to opposite ends of the inductance and their filaments connected to the midpoint of the inductance, a coil having its ends connected to the grids of the vacuum tubes, a vacuum tube oscillator coupled to said coil and means located between said oscillator and said coil for controlling the wave form applied to control the change in radiation frequency.

20. The combination for the reduction of fading effects during the transmission of electromagnetic waves of a receiver tuned at a single setting to a band of frequencies, and a transmitter transmitting a modulated carrier wave whose frequency is varied in a predetermined fashion cyclically within the band of frequencies to which the receiver is tuned in order to reduce fading effects at the receiver.

21. The method of transmitting radio signals for the purpose of reducing fading effects, which consists of the modulation of a variable frequency carrier wave, the carrier frequency being varied continuously and cyclically to values not more than 1.05 times, nor less than 0.95 times the mean frequency of the carrier.

22. The method of reducing fading of radio signals in a receiver tuned at one setting to a single relatively narrow band of frequencies which includes continuously and cyclically varying the frequency of a modulated carrier wave so as to have values within the band of frequencies to which the receiver is tuned.

23. The method of transmitting radio signals for the sole purpose of reducing fading effects during reception on a receiver tuned at one setting to a single band of frequencies, which includes the step of modulating a carrier wave whose frequency is cyclically and continuously varied so as to have values within the band of frequencies to which the receiver is tuned, the cyclic variation of the carrier frequency occuring at a super audible rate.

ALFRED N. GOLDSMITH.